(12) United States Patent
Bercovici et al.

(10) Patent No.: US 9,615,299 B1
(45) Date of Patent: Apr. 4, 2017

(54) METHOD AND APPARATUS FOR MITIGATING INTERFERENCE BETWEEN MOBILE DEVICES IN A WIRELESS COMMUNICATION SYSTEM

(71) Applicant: MOTOROLA SOLUTIONS, INC, Schaumburg, IL (US)

(72) Inventors: Mihael S. Bercovici, Shoham (IL); Eitan Koren, Raanana (IL); Eitan Kugman, Petah Tikva (IL); Yaron Avi Shemesh, Kfar-Yona (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/870,760

(22) Filed: Sep. 30, 2015

(51) Int. Cl.
| | |
|---|---|
| *H04W 36/00* | (2009.01) |
| *H04W 36/20* | (2009.01) |
| *H04W 36/14* | (2009.01) |
| *H04W 64/00* | (2009.01) |
| *H04W 76/02* | (2009.01) |
| *H04W 40/22* | (2009.01) |
| *H04W 16/14* | (2009.01) |
| *H04W 88/06* | (2009.01) |
| *H04W 88/04* | (2009.01) |

(52) U.S. Cl.
CPC ........... *H04W 36/20* (2013.01); *H04W 16/14* (2013.01); *H04W 36/14* (2013.01); *H04W 40/22* (2013.01); *H04W 64/00* (2013.01); *H04W 76/023* (2013.01); *H04W 76/025* (2013.01); *H04W 88/04* (2013.01); *H04W 88/06* (2013.01)

(58) Field of Classification Search
CPC ..... H04W 36/20; H04W 36/14; H04W 64/00; H04W 76/023; H04W 76/025; H04W 40/22; H04W 16/14; H04W 88/06; H04W 88/04
USPC ................... 455/438, 436, 435.2, 435.1, 440
See application file for complete search history.

(56) References Cited

U.S. PATENT DOCUMENTS

| | | |
|---|---|---|
| 6,301,478 B1 | 10/2001 | Wallstedt et al. |
| 8,792,930 B1 | 7/2014 | Gopalakrishnan et al. |

(Continued)

FOREIGN PATENT DOCUMENTS

WO    2010146238 A1    12/2010

OTHER PUBLICATIONS

The International Search Report and the Written Opinion, for corresponding SN: PCT/US2016/053033, filed Sep. 22, 2016, all pages.

*Primary Examiner* — Khai M Nguyen (57) ABSTRACT

A method, apparatus, and system are provided for mitigating interference between two communication sessions based on a determined geographical proximity of two mobile devices (MDs) to each other. In one embodiment, a geographical proximity is determined of a first MD, engaged in a first communication session, to a second MD, engaged in a second communication session. Based on the determined geographical proximity, one of the two communication sessions is transferred to the other MD so that both communication sessions are resident at, and can be controlled by, a same MD. In other embodiments, wherein a first MD is engaged in two communication sessions, one of the two communication sessions may be transferred to a second MD that is sufficiently geographically distant from the first MD or the first MD may use a geographically distant remote wireless device as an uplink and downlink relay device for one of the communication sessions.

14 Claims, 7 Drawing Sheets

(56) References Cited

U.S. PATENT DOCUMENTS

| | | |
|---|---|---|
| 9,066,363 B2 | 6/2015 | Anderson et al. |
| 9,265,048 B2* | 2/2016 | Sampath ............. H04W 72/082 |
| 2007/0109973 A1* | 5/2007 | Trachewsky .......... H04W 16/14 |
| | | 370/252 |
| 2011/0237188 A1 | 9/2011 | Sen |
| 2013/0083722 A1* | 4/2013 | Bhargava ............ H04W 72/085 |
| | | 370/315 |
| 2013/0183904 A1* | 7/2013 | Hiben ................. H04W 72/082 |
| | | 455/63.1 |

* cited by examiner

METHOD AND APPARATUS FOR MITIGATING INTERFERENCE BETWEEN MOBILE DEVICES IN A WIRELESS COMMUNICATION SYSTEM

FIELD OF THE INVENTION

The present invention relates generally to wireless communication systems and, in particular, to mitigating inter-mobile device and intra-mobile device interference in a wireless communication system.

BACKGROUND OF THE INVENTION

The Federal Communications Commission (FCC) is responsible for allocating the finite radio frequency spectrum among various government entities, cellular telephone and data carriers, and a host of competing corporate and individual interests. In that capacity, the FCC has allocated certain frequency bands for use by and for the benefit of local, state, and national public safety organizations and applications.

Figure 1:
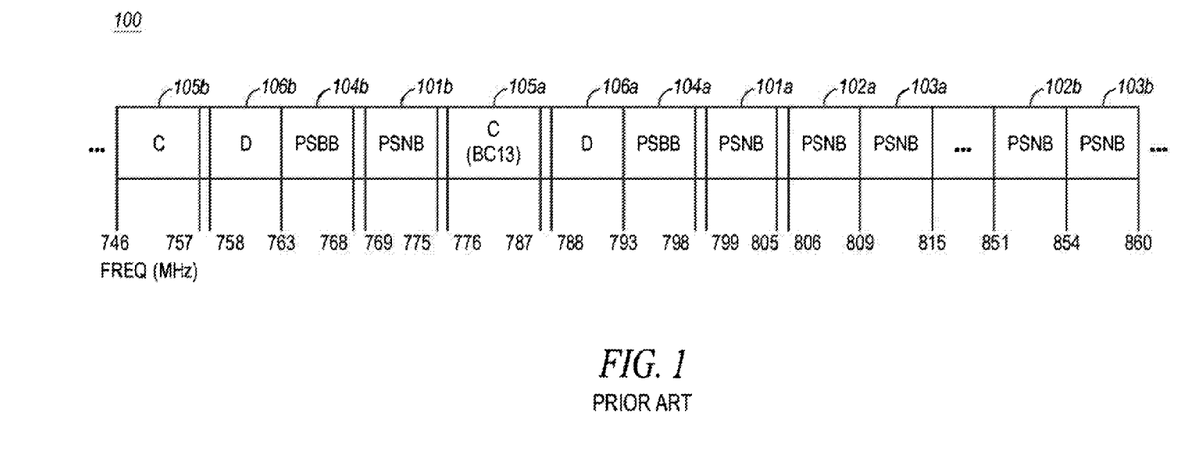
FIG. 1 illustrates a portion of the electromagnetic spectrum including bandwidths allocated to public safety applications and public operators.

Referring to FIG. 1, a portion 100 of the electromagnetic spectrum, including bandwidths allocated by the FCC to public safety applications, is depicted. A frequency band 101a from 799 to 805 megahertz (MHz) has been allocated for uplink (UL) transmissions by public safety narrowband (PSNB) voice communications by police, fire, and other emergency response teams. Frequency band 101a is paired with a frequency band 101b from 769 to 775 MHz that has been allocated for downlink (DL) transmissions by such PSNB voice communications by police, fire, and other emergency response teams. These frequencies support Push-to-Talk (PTT) land mobile radio (LMR) two-way radio devices used by law enforcement agencies across the country. Similarly, a frequency band 102a from 806 to 809 MHz, and a frequency band 103a from 809 to 815 MHz, has each been allocated for UL PSNB transmissions and is each respectively paired with a frequency band 102b from 851 to 854 MHz, and a frequency band 103b from 854 to 860 MHz, that has been allocated for DL PSNB transmissions.

A frequency band 104a from 793 to 798 MHz has been allocated for UL broadband public safety transmissions, for example, by police, fire, and other emergency response teams. Frequency band 104a is, in turn, paired with a frequency band 104b from 763 to 768 MHz that has been allocated for DL broadband public safety transmissions by police, fire, and other emergency response teams. The FCC has mandated the use of Third Generation Partnership Project (3GPP) Long Term Evolution (LTE) technology in this broadband spectrum. This corresponds to the upper portion of the 3GPP evolved universal mobile telecommunications system terrestrial radio access (E-UTRA) operating band 14 of the frequency spectrum.

The FCC also has designated a frequency band 105a from 776 to 787 MHz for UL broadband transmissions, and paired with a frequency band 105b from 746 to 756 MHz for DL broadband transmissions (referred to as operating band 13, or BC13, and also expected to be LTE compliant) by public operators, such as Verizon Wireless.

Further, the FCC has designated a frequency band 106a from 788 to 793 MHz for UL broadband operations (possibly with shared access) for public safety transmissions, and has paired this with a frequency band 106b, from 758 to 763 MHz, for DL broadband operations (possibly with shared access) for public safety transmissions, which also may be mandated as LTE compliant. This corresponds to the lower portion of the 3GPP E-UTRA operating band 14.

Because the foregoing public safety broadband spectrum allocations are spectrally near the PSNB voice band, some of the energy from the broadband allocations may "leak" into a PSNB network. Under certain conditions, this leakage, known as out-of-band emissions (OOBE), may cause undesirable radio interference to communications between an LMR base station and one or more of LMR mobile devices, for example, resulting in desensitization of a receiver of the LMR mobile device, particularly when the LMR mobile device is geographically co-located (for example, in the same police car or fire truck or even in a same radio) with the interfering broadband radio/mobile device.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method, apparatus, and system are provided for mitigating interference between two communication sessions based on a determined geographical proximity of two mobile devices to each other. In one embodiment, a first mobile device establishes a first communication session using a first wireless communication protocol and a second mobile device establishes a second communication session using a second wireless communication protocol. A geographical proximity of the two mobile devices to each other is determined and, based on the determined geographical proximity, it is determined that one of the mobile devices is a potential interferer for the other mobile device. One of the two communication sessions then is transferred to the other mobile device so that both communication sessions are consolidated at a same mobile device, thereby allowing that mobile device to operate to mitigate the interference between the two sessions. In other embodiments, wherein a first mobile device is engaged in two communication sessions, the first mobile device may determine to transfer one of the two communication sessions to a second mobile device is sufficiently geographically distant from the first mobile device, or the first mobile device may determine to use a remote wireless device as a relay device for uplink and downlink transmissions for one of the two communication sessions when the remote wireless is sufficiently geographically distant from the first mobile device. By transferring, or handing over, one of the two communication sessions to the second mobile device or by using the remote wireless device as a relay device, a likelihood is reduced that an uplink transmission as part of one of the two communication sessions will interfere with a downlink reception as part of the other of the two communication sessions.

For example, one embodiment of the present invention encompasses a system for mitigating interference between communication sessions in a wireless communication system. The system includes a first mobile device and a second mobile device, wherein each of the first mobile device and the second mobile device comprises a first modem that operates according to a first wireless communication protocol and a second modem that operates according to a second wireless communication protocol. The first mobile device is configured to establish a first communication session using the first modem of the first mobile device and the first wireless communication protocol, and the second mobile device is configured to: establish a second communication session using the second modem of the second mobile device and the second wireless communication protocol; determine a geographical proximity of the first mobile device; based on the determined geographical proximity, determine that one of the first mobile device and the second mobile device is a potential interferer for the other mobile device of the first mobile device and the second mobile device; in response to determining that one of the first mobile device and the second mobile device is a potential interferer for the other mobile device, arrange for a transfer of the first communication session to the second mobile device; and in response to transferring the first communication session to the second mobile device, operate to mitigate interference at the second mobile device between the first communication session and the second communication session.

Another embodiment of the present invention encompasses a system for mitigating interference between communication sessions in a wireless communication system. The system includes a first mobile device and a second mobile device, wherein each of the first mobile device and the second mobile device comprises a first modem that operates according to a first wireless communication protocol and a second modem that operates according to a second wireless communication protocol. The first mobile device is configured to: establish a first communication session using the first modem of the first mobile device and the first wireless communication protocol; establish a second communication session using the second modem of the first mobile device and the second wireless communication protocol; determine a geographical proximity of the first mobile device to the second mobile device; based on the determined geographical proximity, determine to transfer the second communication session to the second mobile device; and in response to determining to transfer the second communication session, transfer the second communication session to the second mobile device.

Yet another embodiment of the present invention encompasses an apparatus for mitigating interference in a wireless communication system. The apparatus includes multiple modems and a processor. The processor is configured to: establish a first communication session using a modem of the multiple modems and a first wireless communication protocol; establish a second communication session using another modem of the plurality of modems and a second wireless communication protocol; determine a geographical proximity of a user-based wireless communication device to the mobile device; based on the determined geographical proximity, determine to utilize the user-based wireless communication device as a relay device for the first communication session; and in response to determining to utilize the user-based wireless communication device as a relay device for the first communication session, establish a third communication session with the user-based wireless communication device using a third wireless communication protocol and relay communications for the first communication session via the user-based wireless communication device using the third wireless communication protocol.

Figure 2:
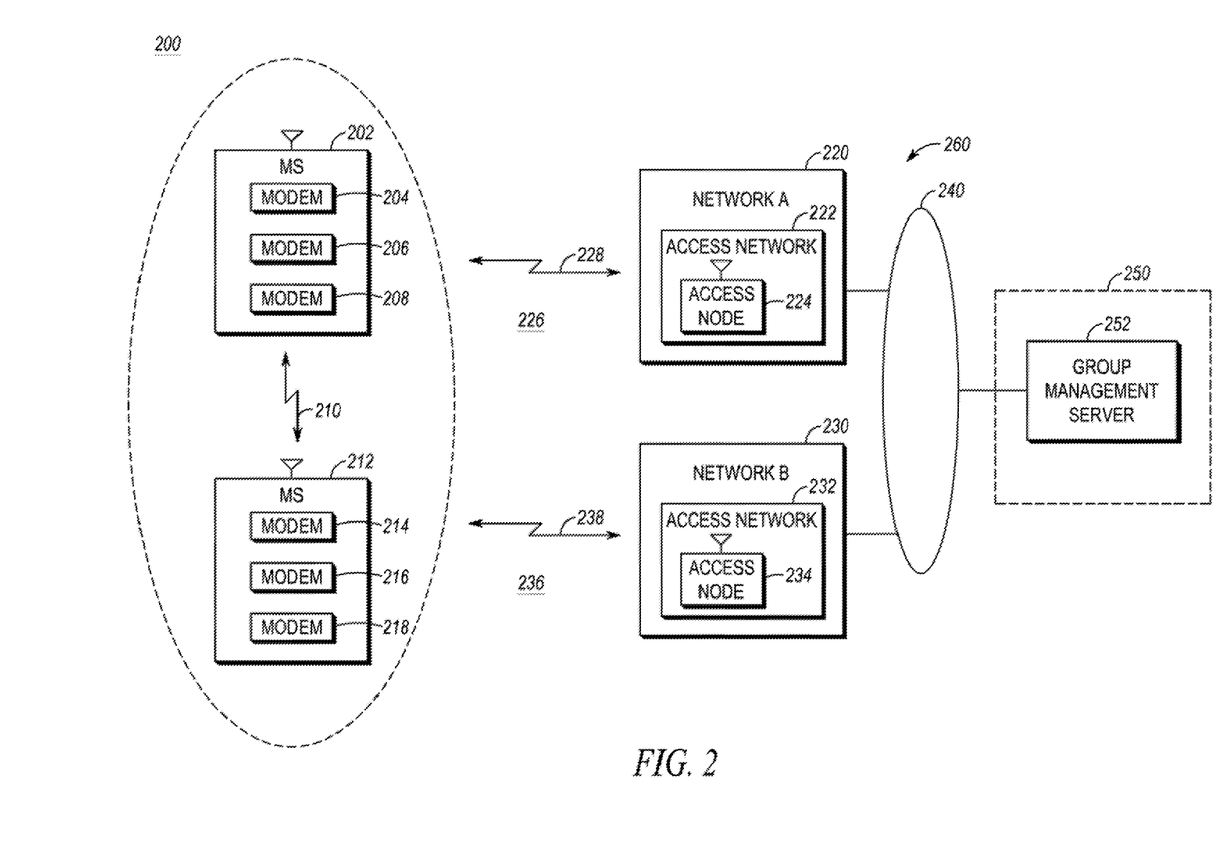
FIG. 2 is a block diagram of a wireless communication system in accordance with various embodiments of the present invention.

The present invention may be more fully described with reference to FIGS. 2-8. FIG. 2 is a block diagram of a wireless communication system 200 in accordance with some embodiments of the present invention. Communication system 200 includes multiple wireless communication networks 220, 230 (two shown), such as a first network ('Network A') 220 that operates according to a first wireless communication protocol and a second network 230 ('Network B') that operates according to a second wireless communication protocol. First network 220 comprises a first access network 222 that includes a first access node 224 and that provides wireless communications services to mobile devices residing in a coverage area 226 of the first access node via a first air interface 228 and the first wireless communication protocol. Second network 230 comprises a second access network 232 that includes a second access node 234 that provides wireless communications services to mobile devices residing in a coverage area 236 of the second access node via a second air interface 238 and the second wireless communication protocol. Each of air interfaces 228 and 238 includes an uplink and a downlink, which uplinks and downlinks each includes multiple traffic channels and multiple signaling channels.

In various embodiments of the present invention, each of the first and second networks 220, 230 may be a same type of network or a different type of network. For example, each of the first and second networks 220, 230 may be a broadband network, each of the first and second networks 220, 230 may be a narrowband network, or one network of the first and second networks 220, 230 may be a broadband network and the other network of the first and second networks 220, 230 may be a narrowband network.

For example, one of the multiple networks 220, 230 may be a narrowband network used by a local agency or enterprise, such as a public safety organization, which narrowband network implements a specialized voice communication system that typically supports low-bit-rate digital or analog transmission of audio and/or data streams. An example of such a narrowband network is a network used by a Project 25 (P25)-compatible two-way Push-To-Talk voice communication system that includes wireless and wired voice communication devices. Other examples include a Land Mobile Radio (LMR) network or a Terrestrial Trunked Radio (TETRA) system network. Public safety organizations may choose these narrowband systems because they provide improved end-to-end voice quality and efficient group communication, use advanced cryptography, enable centralized logging of calls, and/or are associated with lower delay and higher reliability. By way of further example, another of the multiple networks 220, 230 may be a broadband network used, in parallel, by the public safety organization to support data applications or may be a commercial carrier broadband network that supports users' personal devices (for example, a 'bring your own device' (BYOD)). An example of such a broadband network is a network that operates in accordance with the Third Generation Partnership Project (3GPP) or 3GPP2 standards or their next generation standards, such as the 3GPP LTE (Long Term Evolution) standard wherein the core network is an evolved packet core (EPC). Broadband networks typically support high-bit-rate digital transmission of data streams, including real-time video.

Communication system 200 further includes multiple mobile devices 202, 212 (two shown) that each resides within a coverage area 226, 236, such as a cell or a sector of a cell, of one or more of networks 220, 230 and that each is provided wireless service by an access node 224, 234 of the corresponding network 220, 230 via the corresponding air interface 228, 238. In various technologies, mobile devices 202, 212 may be referred to as a mobile station (MS), user equipment (UE), user terminal (UT), subscriber station (SS), subscriber unit (SU), remote unit (RU), access terminal, and so on. Each of the multiple mobile devices 202, 212 is configured to operate on a narrowband network and/or a broadband network, such as on first network 220 or on second network 230, and to communicate with infrastructure devices in the corresponding network using any suitable over-the-air protocol and modulation scheme. Further, in various embodiments of the present invention, each of the multiple mobile devices 202, 212 may be associated with a same user or with different users.

Mobile devices 202 and 212 may be "paired" to collaborate (that is, may be collaborative devices) so that information sent to, or received from, one of mobile devices 202, 212 may be based on information sent to, or received from, the other mobile device 202, 212, respectively. "Pairing" the devices means that the devices are within range of, and can communicate with, each other via a short-range wireless link 210 utilizing a third wireless communication protocol, such as a Bluetooth® link, a near-field communication (NFC) link, or a Wi-Fi link. The ability to perform device collaboration between mobile devices 202 and 212 may enable a user to use either mobile device 202 or mobile device 212 beyond the capabilities offered by such a mobile device.

At least one of the multiple mobile devices 202, 212, such as mobile device 212, is a multi-mode, or converged, mobile device that is configured to operate over both the first and second networks 220, 230. That is, each of the multiple mobile devices 202, 212 includes at least one modem for wireless communications with other mobile devices and/or with infrastructure 260. For example, as depicted in FIG. 2, each of a first mobile device 202 and a second mobile device 212 of the multiple mobile devices 202, 212 may include a first modem 204, 214 for wireless communication with first network 220 via the first wireless communication protocol, a second modem 206, 216 for wireless communication with second network 230 via the second wireless communication protocol, and a third modem 208, 218 for short-range communication with other mobile devices, such as mobile device 212 with respect to mobile device 202 or mobile device 202 with respect to mobile device 212, via the third wireless communication protocol.

Communication system 200 further includes a local agency or enterprise service network 250 that is accessible by mobile devices 202 and 212 via networks 220 and 230 and a data network 240, such as a private network or the Internet. Service network 250 includes one or more application functions (AFs), such as a Group Management Server 252, for example, a Push-to-Talk (PTT) Server. Access nodes 224 and 234, data network 240, and Group Management Server 252 collectively comprise an infrastructure 260 of communication system 200 and, correspondingly, each may be referred to as an infrastructure element of communication system 200.

Figure 3:
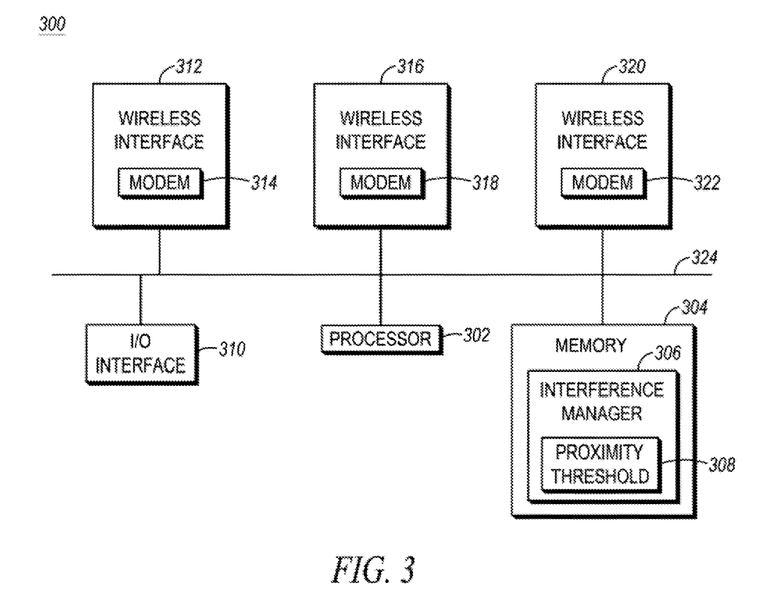
FIG. 3 is a block diagram of a mobile device of the wireless communication system of FIG. 2 in accordance with some embodiments of the present invention.

Referring now to FIG. 3, a block diagram of a mobile device 300, such as mobile devices 202, 212, and 702 (described below), is provided in accordance with some embodiments of the present invention. Mobile device 300 may be, for example, a smart phone, a land mobile radio (LMR), a vehicle modem, a server mounted in vehicle, a tablet, a laptop, a body-worn computing device, etc. Mobile device 300 generally includes a processor 302, at least one memory device 304, one or more input/output (I/O) interfaces 310, and multiple wireless interfaces 312, 316, 320 (three shown). It should be appreciated by those of ordinary skill in the art that FIG. 3 depicts mobile device 300 in an oversimplified manner, and a practical embodiment may include additional components and suitably configured processing logic to support known or conventional operating features that are not described in detail herein. The components (302, 304, 310, 312, 316, and 320) of mobile device 300 are communicatively coupled via a local interface 324. Local interface 324 can be, for example but not limited to, one or more buses or other wired or wireless connections, as is known in the art. Local interface 324 can have additional elements, which are omitted for simplicity, such as controllers, buffers (caches), drivers, repeaters, and receivers, among many others, to enable communications. Further, local interface 324 may include address, control, and/or data connections to enable appropriate communications among the aforementioned components.

Mobile device 300 operates under the control of processor 302, such as one or more microprocessors, microcontrollers, digital signal processors (DSPs), combinations thereof or such other devices known to those having ordinary skill in the art. Processor 302 operates the corresponding mobile device according to data and instructions stored in the at least one memory device 304, such as random access memory (RAM), dynamic random access memory (DRAM), and/or read only memory (ROM) or equivalents thereof, that stores data and instructions that may be executed by the corresponding processor so that the mobile device may perform the functions described herein.

The one or more I/O interfaces 310 may include user interfaces that allow a user to input information in, and receive information from, mobile device 300. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 310 also can include, for example, a serial port, a parallel port, a small computer system interface (SCSI), an infrared (IR) interface, a universal serial bus (USB) interface, and the like for communicating with, or coupling to, an external device.

The multiple wireless interfaces 312, 316, 320 (three shown) each includes a respective modem 314, 318, 322 and facilitates an exchange of wireless communications with other mobile devices and/or with an access network, such as access networks 222 and 232. For example, the multiple wireless interfaces 312, 316, 320 may include one or more wireless interfaces 312, 316 for wireless wide area communications, such as a wireless area network (WAN) or a wireless local area network (WLAN) communications. Each of the one or more wireless interfaces 312, 316 includes a corresponding modem 314, 318, such as modems 204 and 206 of mobile device 202 and modems 214 and 216 of mobile device 202, and antenna for generating WAN/WLAN wireless signals. For example, in the event of a multi-mode mobile device, one of wireless interfaces 312 and 316, and correspondingly one of modems 314 and 318, may be a narrowband interface and modem supporting wireless communications with a narrowband network while the other wireless interface and modem of wireless interfaces 312 and 316 and modems 314 and 318 may be a broadband interface and modem supporting wireless communications with a broadband network. The multiple wireless interfaces 312, 316, 320 further may include a short-range wireless interface 320, such as modem 208 of mobile device 202 and modem 218 of mobile device 212, for short-range communications with other mobile devices. Short-range wireless interface 320 may be a Bluetooth apparatus that includes a Bluetooth modem 322 and antenna, a near-field communication (NFC) apparatus (or simply near-field apparatus) that includes an NFC modem 322 and a resonant NFC antenna, or a Wi-Fi apparatus that includes a Wi-Fi modem 322 and antenna.

The data and instructions maintained by at least one memory device 304 include software programs that include an ordered listing of executable instructions for implementing logical functions. For example, the software in at least one memory device 304 includes a suitable operating system (O/S) and programs. The operating system essentially controls the execution of other computer programs, and provides scheduling, input-output control, file and data management, memory management, and communication control and related services. The programs may include various applications, add-ons, etc. configured to provide user functionality with mobile device 300, for example, at least one memory device 304 maintains a group call client that, when executed by processor 302, facilitates a peer-to-peer exchange of signaling and traffic with Group Management Server 252. At least one memory device 304 further maintains at least one identifier (ID) of the mobile device, such as a subscriber unit identifier (SUID), an IMEI, an MSISDN, an IMSI, and/or a SIP URI, which uniquely identifies the mobile device in communication system 200.

At least one memory device 304 further includes an interference manager module 306 (also referred to herein as an 'interference manager') that allows mobile device 300 to determine when a physical proximity of the mobile device to another mobile device poses a potential for interference and that collaboratively negotiates interference mitigation with an interference manager of the another mobile device. Interference manager 306 includes a proximity threshold 308 that defines a physical proximity, or geographical distance, between two mobile devices wherein an uplink transmission by one of the two mobile devices may produce unacceptable interference for downlink reception by the other mobile device, for example, when the uplink transmission and downlink reception are on spectrally-proximate spectrum and/or when an uplink transmission by one of the two mobile devices produces intermodulation distortion (IMD) components that fall within a spectrum of a downlink reception by the other mobile device. A value for proximity threshold 308 can be hard-coded or can be a user-configurable setting. User-configurability of the proximity threshold 308 can allow interference manager 306 to be fine-tuned on a user or a situational basis (that is, static versus transient proximate mobile devices).

Figure 4:
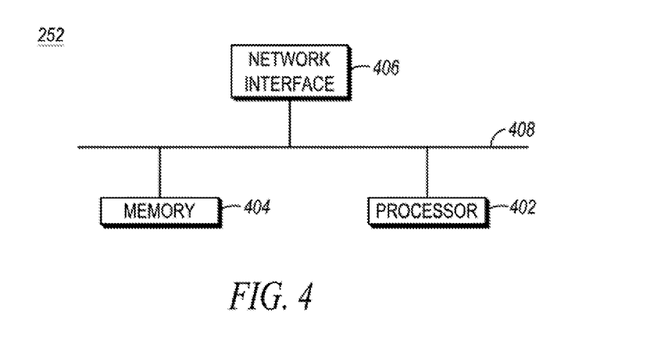
FIG. 4 is a block diagram of a Group Management Server of the wireless communication system of FIG. 2 in accordance with an embodiment of the present invention.

Referring now to FIG. 4, a block diagram is provided of Group Management Server 252 in accordance with an embodiment of the present invention. Group Management Server 252 includes a processor 402, such as one or more microprocessors, microcontrollers, digital signal processors (DSPs), combinations thereof or such other devices known to those having ordinary skill in the art. Group Management Server 252 further includes an at least one memory device 404, such as random access memory (RAM), dynamic random access memory (DRAM), and/or read only memory (ROM) or equivalents thereof, that is in communication with a corresponding processor 402, via a corresponding local interface 408. At least one memory device 404 stores data and programs, such as group call programs, that may be executed by processor 402 and that allows the Group Management Server to perform all functions necessary to operate in communication system 200. Group Management Server 252 further includes one or more network interfaces 406 (one shown) that is in communication with processor 402 via a local interface 408 and that provides for interfacing with other infrastructure devices of communication system 200, such as data network 240 and, via the data network, with networks 220 and 230. Local interface 408 can be, for example but not limited to, one or more buses or other wired or wireless connections, as is known in the art. Local interface 308 can have additional elements, which are omitted for simplicity, such as controllers, buffers (caches), drivers, repeaters, and receivers, among many others, to enable communications. Further, local interface 408 may include address, control, and/or data connections to enable appropriate communications among the aforementioned components of the Group Management Server.

It is assumed herein that a first spectrum used by first network 220, for example, a Public Safety Narrowband spectrum (with an uplink band of 799-805, 806-809, or 809-815 MHz respectively paired with a downlink band of 769-775, 851-854, or 854-860 MHz), is in close spectral proximity to a second spectrum used by second network 230, for example, a 3GPP LTE network operating in the adjacent C block with an uplink band of 776-787 MHz. In some embodiments of the present invention, it is assumed that the first and second mobile devices 202, 212 are in close enough geographical or physical proximity to each other such that an uplink transmission by one of the first and second mobile devices as part of one communication session can result in interference on the reception when the other mobile device is receiving as part of another communication session. For example, in communication system 200, uplink transmissions by a broadband mobile device, such as mobile device 212, in the B13 and/or B14 frequency bands can interfere with reception by a narrowband mobile device, such as mobile device 202, of a narrowband transmission from a narrowband access node, such as access node 224, when the two mobile devices 202 and 212 are geographically or physically proximate to each other, since both the B13 and/or B14 transmission and the narrowband reception use frequencies are relatively close to each other. In order to mitigate the interference, communication system 200 provides for a consolidating of both the first and second communication sessions in a single mobile device. By consolidating both communication sessions in a same mobile device, that mobile device is able to exercise control over uplink transmissions for both communication sessions and thereby mitigate interference between the two sessions.

In other embodiments of the present invention, it is assumed that a converged mobile device, for example, first mobile device 202, is sufficiently far from another mobile device, for example, second mobile device 212, such that an uplink transmission by the second mobile device as part of a second communication session will not cause interference with reception by the first mobile device as part of a first communication session. When two such communication sessions initially are co-located at the same mobile device, such as first mobile device 202, and can potentially interfere with each other, communication system 200 provides for a transfer, or handover, of one of the two communication sessions to the second mobile device. By transferring one of the communication sessions to the second mobile device, a likelihood of interference between the two communication sessions is reduced.

Figure 5:
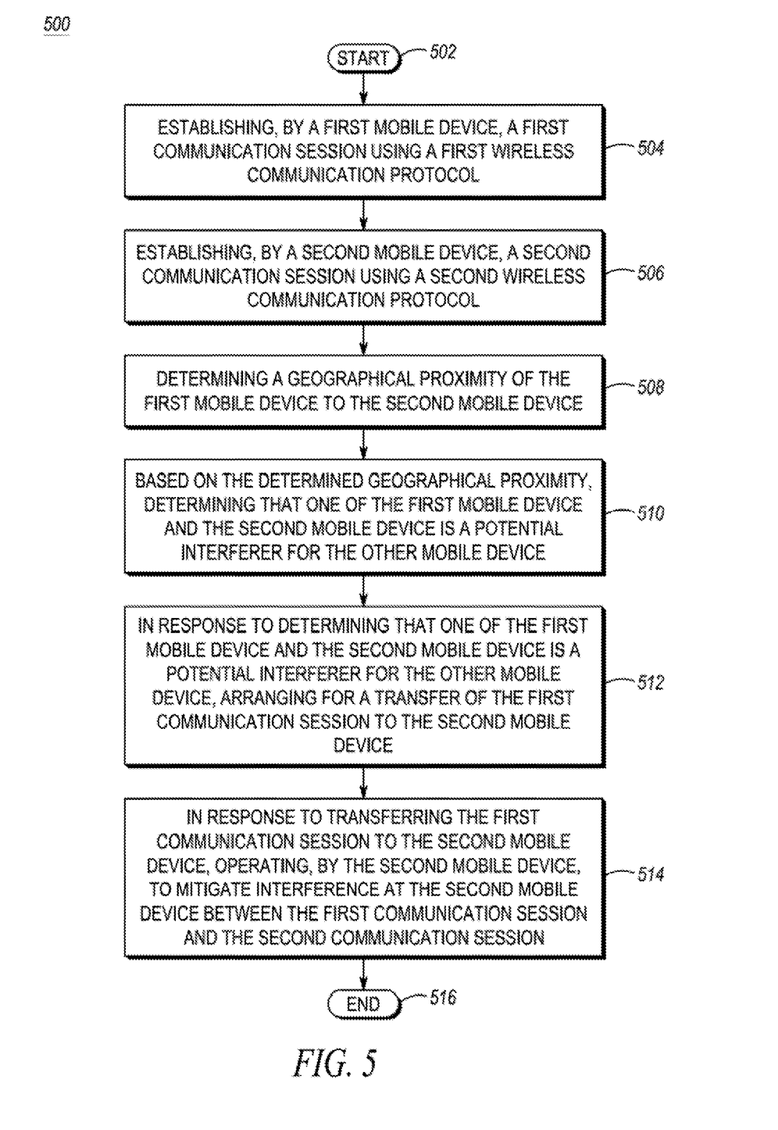
FIG. 5 is a logic flow diagram illustrating a method executed by the wireless communication system of FIG. 2 in mitigating inter-mobile device interference in accordance with some embodiments of the present invention.

Referring now to FIG. 5, a logic flow diagram 500 is provided that illustrates a method performed by communication system 200 in mitigating inter-mobile device interference in accordance with some embodiments of the present invention. Logic flow diagram 500 begins (502) when each of multiple mobile devices 202, 212 registers with a network serving the mobile device, such as first network 220 with respect to a first mobile device 202 of the multiple mobile devices 202, 212 and second network 230 with respect to a second mobile device 212 of the multiple mobile devices 202, 212, and further registers with service network 250, in accordance with well-known techniques.

For example, first mobile device 202 may activate in, or roam into, communication system 200 and, in response to activating in/roaming into communication system 200, register with network 220 and service network 250. Similarly, second mobile device 212 may activate in, or roam into, communication system 200 and, in response to activating in/roaming into communication system 200, register with network 230 and service network 250. As part of the process of registering with service network 250, each of the multiple mobile devices 202, 212 authenticates with, and affiliates with, Group Management Server 252, including conveying group affiliation information to the Group Management Server that includes an identifier of the mobile device and/or a user of the mobile device, such as an SUID, an IMEI, an MSISDN, and/or an IMSI, and information concerning any groups with which the mobile device or mobile device's user is associated, such as a group identifier (ID), for example, a talkgroup ID.

At some point in time after registering with first network 220 and service network 250, first mobile device 202 establishes (504) a first communication session with the first network using modem 204 of the first mobile device and the first wireless communication protocol associated with the first network. Similarly, at some point in time after registering with second network 230 and service network 250, second mobile device 212 establishes (506) a second communication session with the second network using modem 216 of the second mobile device and the second wireless communication protocol associated with the second network.

It is assumed herein that a transmission by one of first mobile device 202 or second mobile device 212 can interfere with reception by the other mobile device. For example, the spectrum employed by the first communication session may be close enough in spectral proximity to spectrum employed by the second communication session that an uplink transmission by second mobile device 212 as part of the second communication session can result in interference on the reception when first mobile device 202 is receiving as part of the first communication session, or vice versa (that is, an uplink transmission by first mobile device 202 as part of the first communication session can result in interference on the reception when second mobile device 212 is receiving as part of the second communication session). By way of another example, interference may result from intermodulation distortion (IMD) components associated with a transmission by one of first mobile device 202 or second mobile device 212, which IMD components may fall in a receive band of the other mobile device.

In order to control such interference, second mobile device 212 determines (508) a geographical proximity of the first mobile device and, based on the determined geographical proximity, determines (510) that the first mobile device is sufficiently geographically close to the second mobile device so as to be a potential interferer for the second mobile device, or vice versa (that the second mobile device is sufficiently close to the first mobile device so as to be a potential interferer for the first mobile device).

That is, communication system 200 does not require that either first mobile device 202 or second mobile device 212 specifically detect and measure interference resulting from uplink transmissions by the other mobile device. Rather, second mobile device 212 determines that uplink transmissions by first mobile device 202, as part of the first communication session, may cause unacceptable interference for downlink reception by the second mobile device as part of the second communication session (or vice versa, that is, that uplink transmissions by the second mobile device, as part of the second communication session, may cause unacceptable interference for downlink reception by the first mobile device as part of the first communication session), based on the determined geographical proximity of the first mobile device to the second mobile device.

For example, first mobile device 202 and second mobile device 212 may establish a Bluetooth or NFC communication link 210 via their respective short-range modems 208 and 218. The mere ability to establish a Bluetooth or NFC communication link 210 with first mobile device 202 may be interpreted by second mobile device 212 as an indication that the first mobile device is physically close enough to the second mobile device so as to be a potential interferer for the second mobile device, that is, that uplink transmissions by first mobile device 202, as part of the first communication session, may cause unacceptable interference for downlink reception by second mobile device 212 as part of the second communication session (or vice versa). By way of another example, second mobile device 212 may determine a received signal strength of a transmission by first mobile device 202 and, based on transmission information received from the first mobile device, an quantity of attenuation of the transmission. When the quantity of attenuation of the transmission is less than an attenuation threshold, then second mobile device 212 may determine that first mobile device is physically close enough to the second mobile device to be a potential interferer for the second mobile device.

By way of yet another example, first mobile device 202 and second mobile device 212 may exchange data with each other comprising location and transmission information. In one such embodiment, first mobile device 202 and second mobile device 212 may establish short-range wireless link 210 and exchange the data comprising location and transmission information over link 210. Communications over link 210 can be a direct communication between the mobile devices 202, 212 with no need for intermediate routing. In another such embodiment, each of first mobile device 202 and second mobile device 212 may provide location information identifying their locations to infrastructure 260, for example, GPS (Global Positioning System) coordinates, and infrastructure 260 then may convey, to each of the first and second mobile devices, the location information received from the other mobile device. Proximity threshold 308 defines a maximum physical proximity separating first mobile device 202 and second mobile device 212 where, for purposes of communication system 200, an uplink transmission by one of the first and second communication devices may cause unacceptable interference with a downlink reception by the other communication device of the first and second communication devices. Based on the location information received by second mobile device 212 concerning a location of first mobile device 202, the second mobile device determines a physical proximity of the first mobile device to the second mobile device and compares the determined physical proximity to proximity threshold 308. When the physical proximity is less than proximity threshold 308, second mobile device 212 determines that one of the first and second mobile devices is a potential interferer for the other mobile device of the first and second mobile devices, that is, that an uplink transmission by the first mobile device, as part of the first communication session, may cause unacceptable interference for downlink reception by the second mobile device as part of the second communication session, or vice versa (that is, an uplink transmission by the second mobile device, as part of the second communication session, may cause unacceptable interference for downlink reception by the first mobile device as part of the first communication session).

In response to determining that one of the first and second mobile devices and/or first and second communication sessions is a potential interferer for the other mobile device/communication session, second mobile device 212 arranges (512) for a transfer, or handover, of the first communication session from the first mobile device to the second mobile device, so that both sessions are now co-located at the second mobile device. For example, second mobile device 212 may request that Group Management Server 252 join the second mobile device to the first communication session and remove first mobile device 202 from the first communication session and/or may request that the Group Management Server re-route, to the second mobile device, communications intended for the first mobile device as part of the first communication session. In response to receiving the request(s) from second mobile device 212, Group Management Server 252 joins the second mobile device 212 to the first communication session and re-routes, to the second mobile device, subsequent communications intended for first mobile device 202.

As part of the transfer of the first communication session to second mobile device 212, Group Management Server 252 may determine an existence of a relationship between the second mobile device and first mobile device 202. For example, Group Management Server 252 may maintain, in at least one memory device 404, an association between the first and second mobile devices. In one such embodiment, the association may be pre-existing and stored in a mobile device profile or a user profile on Group Management Server 252 or on a server accessible by the Group Management Server, prior to the initiation of the first communication session.

In another such embodiment, one or both of the first and second mobile devices 202 and 212 may identify a relationship between the two mobile devices when registering with infrastructure 260 and Group Management Server 252. For example, each of the first and second mobile devices may be associated with, and provide, a same user identity. By way of another example, when one of the first and second mobile devices registers with Group Management Server 252 or with an identity server accessible by the Group Management Server, the registering mobile device may convey, to the Group Management Server or identity server, data such as what other mobile devices that the user of the registering mobile device wants to gain access and/or the conditions under which such access is to be permitted or denied.

By way of yet another example, when one of the first and second mobile devices registers with infrastructure 260 and Group Management Server 252, the registering mobile device may receive an identity token. The identity token comprises at least one of an identification of the user and an identification of the mobile device to which the respective identity token is sent. The registering mobile device then may transfer the identity token, over link 210, to the other mobile device and the other mobile device may convey the received identity token to the Group Management Server 252 when the other mobile device registers or wishes to establish a relationship between the two mobile devices. For example, second mobile device 212 may obtain such an identity token from first mobile device 202 over link 210 and, when requesting to transfer the first communication session from the first mobile device to the second mobile device, convey the identity token (that identifies the first mobile device and/or the user of the first mobile device) to the Group Management Server.

In response to the transferring of the first communication session to second mobile device 212, the second mobile device operates (514) to mitigate interference at the second mobile device between the co-located first and second communication sessions. For example, second mobile device 212 can gate uplink transmissions (that is, hold off transmitting) to second network 230 during scheduled downlink transmissions from first network 220 to avoid interference while the second mobile device receives the downlink transmissions, and/or the second mobile device can gate uplink transmissions to first network 220 during scheduled downlink transmissions from second network 230. For example, second mobile device 212 can buffer or delay an uplink transmission to one such network until the second mobile device receives a scheduled transmission over the other such network. By way of another embodiment, second mobile device 212 can roam to a more remote channel, that is, to a channel farther removed in frequency, for uplink transmissions to one of networks 220 and 230 from the channel used for downlink transmissions from the other of networks 220 and 230. By coordinating when and on what channel each of the modems 214, 216 are communicating, interference between the co-located first and second communication sessions can be avoided and/or minimized Logic flow 500 then ends (516).

That is, by consolidating both the first and second communication sessions in a same mobile device, that is, at second mobile device 212, the second mobile device is able to exercise control over uplink transmissions for both communication sessions and mitigate interference between the two sessions, for example, preventing the second mobile device from transmitting on an uplink as part of the second communication session while the mobile device is receiving a downlink transmission as part of the first communication session.

In another embodiment of the present invention, when two communication sessions are co-located at a first, same mobile device, such as first mobile device 202, and can potentially interfere with each other, communication system 200 provides for a transfer, or handover, of one of the two communication sessions to a second, different mobile device, such as second mobile device 212, that is sufficiently physically distant from the first mobile device such that a likelihood of interference between the two communication sessions is reduced. That is, and referring now to FIG. 6, a logic flow diagram 600 is provided that illustrates a method performed by communication system 200 in mitigating intra-mobile device interference in accordance with some embodiments of the present invention.

Figure 6:
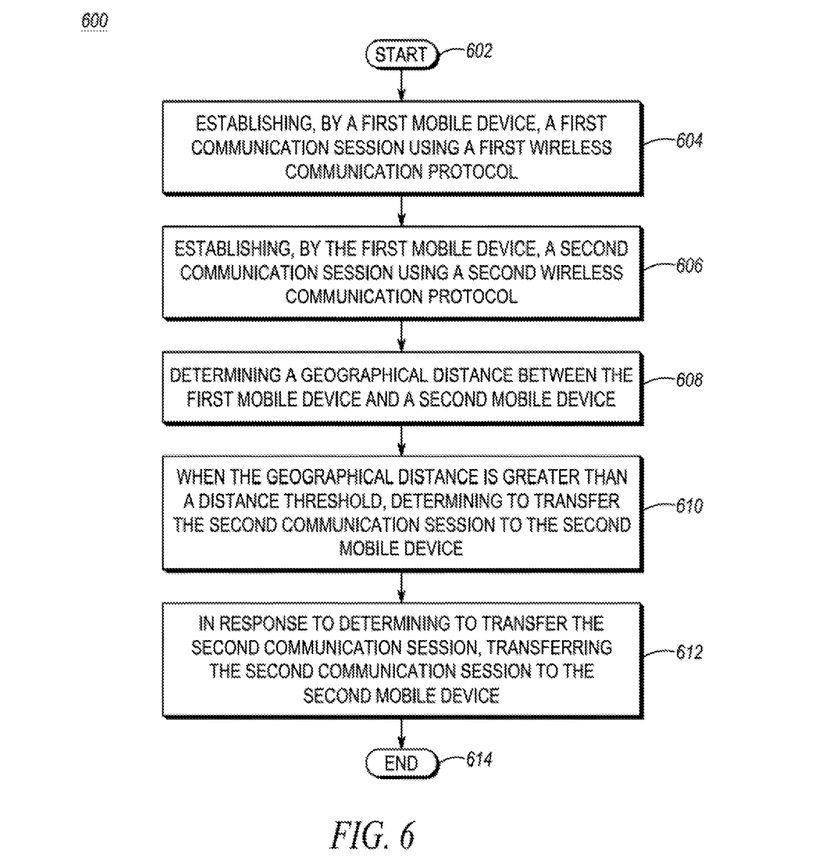
FIG. 6 is a logic flow diagram illustrating a method executed by the wireless communication system of FIG. 2 in mitigating inter-mobile device interference in accordance with some embodiments of the present invention.

Logic flow diagram 600 begins (602) when first mobile device 202 registers with each of first network 220 and second network 230 and with service network 250 in accordance with well-known techniques. At some point in time after registering with first network 220 and service network 250, first mobile device 202 establishes (604) a first communication session with the first network using modem 204 of the first mobile device and the first wireless communication protocol associated with the first network. Similarly, at some point in time after registering with second network 230 and service network 250, first mobile device 202 also establishes (606) a second communication session with the second network using modem 206 of the first mobile device and the second wireless communication protocol associated with the second network.

Again, it is assumed herein that a transmission by one of first mobile device 202 or second mobile device 212 can interfere with reception by the other mobile device. For example, the spectrum employed by the first communication session may be close enough in spectral proximity to spectrum employed by the second communication session that an uplink transmission by first mobile device 202 as part of the second communication session can result in interference on the reception when the first mobile device is receiving as part of the first communication session, or vice versa (that is, an uplink transmission by first mobile device 202 as part of the first communication session can result in interference on the reception when the first mobile device is receiving as part of the second communication session). By way of another example, IMD associated with a transmission by one of the first and second mobile devices may interfere with reception by the other mobile device. In order to mitigate such interference, first mobile device 202 determines (608) a geographical proximity of second mobile device 212 to the first mobile device. Based on the determined geographical proximity, first mobile device 202 determines that a transmission by the second mobile device is not a potential interferer for (that is, will not unacceptably interfere with) a downlink reception by the first mobile device.

For example, first mobile device 202 may determine that it is unable to establish a Bluetooth or NFC communication link 210 with first mobile device 212 and, based on the inability to establish a Bluetooth or NFC communication link, that the second mobile device is sufficiently geographically distant from the first mobile device so as not to be a potential interferer for the first mobile device, that is, that a transmission by the second mobile device, as part of the second communication session, will not interfere with a reception by the first mobile device as part of the first communication session. By way of another example, first mobile device 202 may determine a received signal strength of a transmission by second mobile device 212 and, based on transmission information received from the second mobile device, an quantity of attenuation of the transmission. When the quantity of attenuation of the transmission is greater than an attenuation threshold, then first mobile device 202 may determine that second mobile device 212 is sufficiently geographically distant from the first mobile device so as not to be a potential interferer for the first mobile device.

By way of yet another example, first mobile device 202 and second mobile device 212 may exchange data with each other regarding location and transmission information. In one such embodiment, first mobile device 202 and second mobile device 212 may establish short-range wireless link 210 and exchange the data comprising location and transmission information over link 210. Communications over link 210 can be a direct communication between the mobile devices 202, 212 with no need for intermediate routing. In another such embodiment, each of first mobile device 202 and second mobile device 212 may provide location information identifying their locations to infrastructure 260, for example, GPS coordinates, and infrastructure 260 then may convey, to each of the first and second mobile devices, the location information received from the other mobile device. Based on the location information received by first mobile device 202 concerning a location of second mobile device 212, the first mobile device determines a physical proximity of the second mobile device to the first mobile device and compares the determined physical proximity to proximity threshold 308. When the determined physical proximity is greater than proximity threshold 308, first mobile device 202 determines that second mobile device 212 is sufficiently geographically distant from the first mobile device so as not to be a potential interferer for the first mobile device, that is, determines that an uplink transmission by the second mobile device, as part of the second communication session, will not cause unacceptable interference with a downlink reception by the first mobile device as part of the first communication session, or vice versa (that is, an uplink transmission by the first mobile device, as part of the first communication session, will not cause unacceptable interference with a downlink reception by the second mobile device as part of the second communication session).

In response to determining that the that the second mobile device 212 is sufficiently geographically distant from first mobile device 202 so as not to be a potential interferer for the first mobile device/first communication session, first mobile device 202 determines to (610) transfer, or handover, the second communication session from the first mobile device to the second mobile device, so that the first and second communication sessions are no longer co-located, that is, so that the first communication session now is located at the first mobile device and the second communication is session now is located at the second mobile device, and arranges (612) for such a transfer, or handover. For example, first mobile device 202 may request that Group Management Server 252 join second mobile device 212 to the first communication session and remove the first mobile device from the second communication session and/or may request that the Group Management Server re-route, to the second mobile device, communications intended for the first mobile device as part of the second communication session. In response to receiving the request(s) from first mobile device 202, Group Management Server 252 joins the second mobile device 212 to the second communication session and re-routes, to the second mobile device, subsequent communications intended for first mobile device 202 as part of the second communication session.

Similar to logic flow diagram 500, as part of the transfer of the second communication session to second mobile device 212, Group Management Server 252 may determine the existence of a relationship between the second mobile device and first mobile device 202. For example, Group Management Server 252 may maintain, in at least one memory device 404, an association between the first and second mobile devices. In various such embodiments, the association may be pre-existing and stored in a mobile device profile or a user profile at Group Management Server 252 or on a server accessible by the Group Management Server. By way of another example, one or both of the first and second mobile devices 202 and 212 may identify a relationship between the two mobile devices when registering with infrastructure 260 and Group Management Server 252, or when requesting to transfer the second communication session from the first mobile device to the second mobile device. For example, the first mobile device may convey an identity token (received from the second mobile device and that identifies the second mobile device and/or the user of the second mobile device) to the Group Management Server when registering with the Group Management Server or when requesting to transfer the second communication session. In response to the transferring of the second communication session to second mobile device 212, the second mobile device participates in the second communication session, and the first mobile device ceases to participate in the second communication session and/or, at the least, ceases all transmission as part of the second communication session, and logic flow diagram 600 then ends (614).

By first mobile device 202 transferring, or handing over, one of the two communication sessions to second mobile device 212 when the second mobile device is sufficiently geographically distant from the first mobile device, the first mobile device reduces a likelihood that an uplink transmission as part of one of the two communication sessions will interfere with a downlink reception as part of the other of the two communication sessions. However, in yet another embodiment of the present invention, first mobile device 202 may reduce a likelihood that an uplink transmission as part of a first communication session will interfere with a downlink reception as part of a second communication session by using a remote wireless device as a relay device for uplink and downlink transmissions when the second mobile device is sufficiently geographically distant from the first mobile device.

Figure 7:
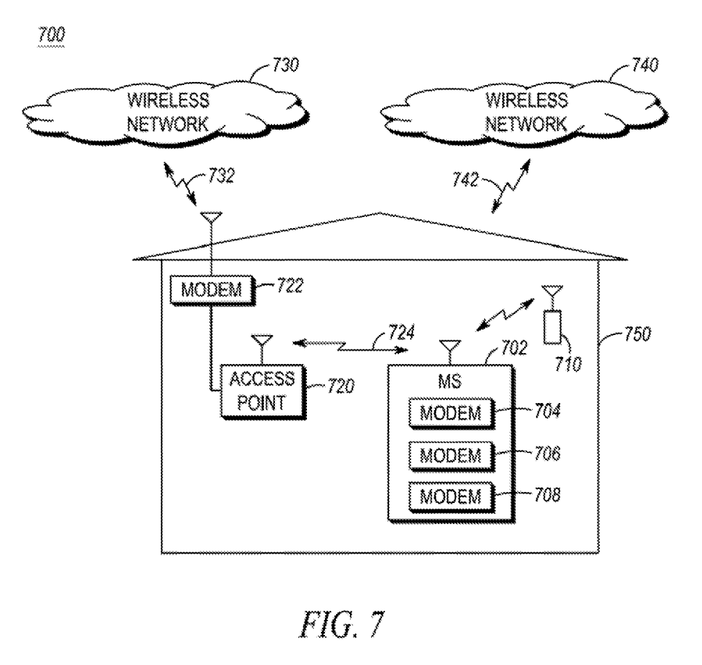
FIG. 7 is a block diagram of a wireless communication system in accordance with some embodiments of the present invention.

For example, and referring now to FIG. 7, a block diagram is provided of a wireless communication system 700 in accordance with some embodiments of the present invention. Similar to wireless communication system 200, wireless communication system 700 includes multiple wide area wireless communication networks (WANs) 730, 740 (two shown), such as a first network 730 that operates according to a first wireless communication protocol and a second network 740 that operates according to a second wireless communication protocol. First network 730 provides wireless communications services to mobile devices via a first air interface 732 and the first wireless communication protocol, and second network 740 provides wireless communications services to mobile devices via a second air interface 742 and the second wireless communication protocol. Each of air interfaces 732 and 742 includes an uplink and a downlink, which uplinks and downlinks each includes multiple traffic channels and multiple signaling channels.

In various embodiments of the present invention, each of the first and second networks 730, 740 may be a same type of network or a different type of network. For example, each of the first and second networks 730, 740 may be a broadband network, each of the first and second networks 730, 740 may be a narrowband network, or one network of the first and second networks 730, 740 may be a broadband network and the other network of the first and second networks 730, 740 may be a narrowband network.

Communication system 700 further includes a mobile device 702 that resides within a coverage of one or more of networks 730, 740. In various technologies, mobile device 702 may be referred to as a mobile station (MS), user equipment (UE), user terminal (UT), subscriber station (SS), subscriber unit (SU), remote unit (RU), access terminal, and so on. Mobile device 702 is a multi-mode, or converged, mobile device that is configured to operate over both the first and second networks 730, 740. That is, mobile device 702 includes a first modem 704 for wireless communication with first network 730 via the first wireless communication protocol and a second modem 706 for wireless communication with second network 740 via the second wireless communication protocol. Mobile device 702 further includes at least a third modem 708 for short-range communications via a third, short-range wireless communication protocol, such as the Bluetooth® protocol, an NFC protocol, or the Wi-Fi protocol.

Communication system 700 further includes a user-based wireless communication device 720, for example, a local access point (AP) such as a home AP (and hereinafter referred to as "AP 720"), that provides wireless services to mobile devices, such as mobile device 702, residing within a coverage area of AP 720, such as within a residence or a commercial building 750, via the third, short-range wireless communication protocol. AP 720 further communicates with network 730 via a modem 722 connected to, or included in, the AP and that operates in accordance with the appropriate wireless communication protocol and modulation scheme. Communication system 700 additionally may include another user wireless device 710 (that is, in addition to mobile device 702), for example, another mobile device, such as a wireless-enabled laptop computer or personal computer, or a Bluetooth-enabled electronic equipment, such as audio or video equipment, capable of communicating with mobile device 702 via a short-range wireless communication protocol, such as the same short-range wireless communication protocol employed by AP 720 or a different short-range wireless communication protocol.

Figure 8:
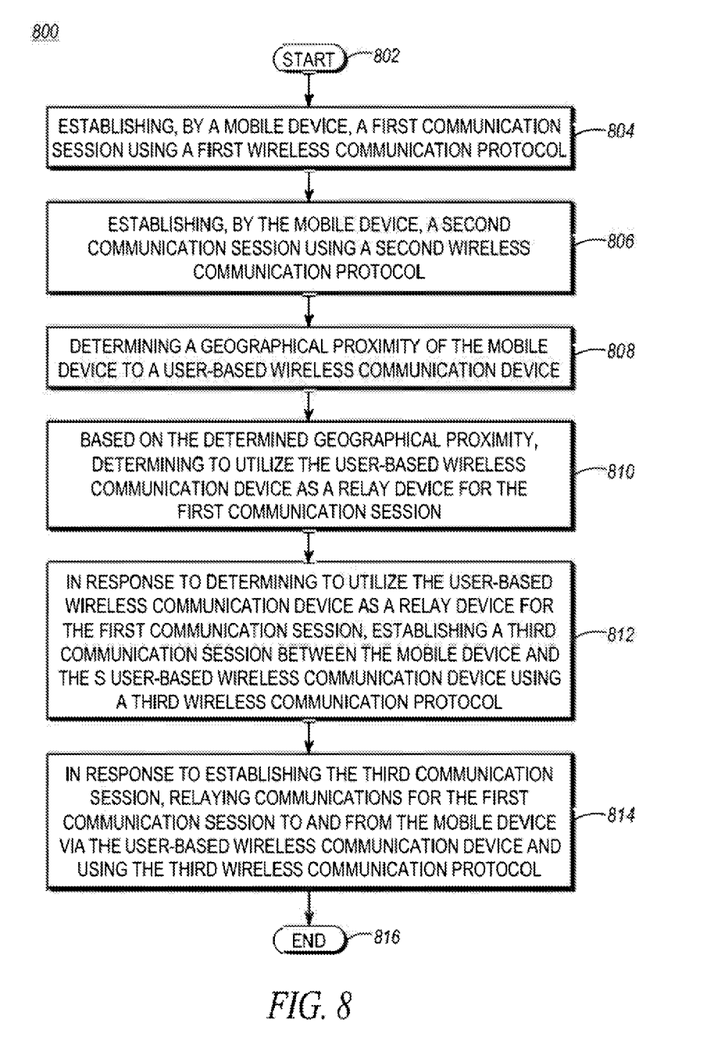
FIG. 8 is a logic flow diagram illustrating a method executed by the wireless communication system of FIG. 7 in mitigating inter-mobile device interference in accordance with some embodiments of the present invention.

Referring now to FIG. 8, a logic flow diagram 800 is provided that illustrates a method performed by communication system 700 in mitigating intra-mobile device interference in accordance with some embodiments of the present invention. Logic flow diagram 800 begins (802) when mobile device 702 registers with first network 730, and optionally with second network 740, in accordance with well-known registration techniques. At some point in time after registering with first network 730, mobile device 702 establishes (804) a first communication session with the first network using modem 704 of the mobile device and the first wireless communication protocol associated with the first network. Mobile device 702 also establishes (806) a second communication session with one of second network 740, using modem 706 of the mobile device and the second wireless communication protocol, or with wireless device 710 using modem 708 and the appropriate short-range wireless communication protocol.

It is assumed herein that a transmission by mobile device 702 as part of the first communication session can interfere with reception by the mobile device as part of the second communication session. In order to mitigate such interference, mobile device 702 determines (808), as described above with respect to FIG. 6, a geographical proximity of AP 720 to mobile device 702 and, based on the determined geographical proximity, that AP 720 is sufficiently geographically distant from mobile device 702 so as to not be a potential interferer for mobile device 702, that is, that an uplink transmission by the AP 720 as part of the first communication session will not cause unacceptable interference with a downlink reception by mobile device 702 as part of the second communication session.

In response to determining that the that AP 720 is sufficiently geographically distant from mobile device 702 so as not to be a potential interferer for the mobile device/second communication session, mobile device 702 determines (810) to utilize the AP as a relay device for uplink transmissions as part of the first communication session. That is, AP 720 becomes a remote control terminal that relays voice and/or data messages between wireless network 730 and mobile device 702. Preferably, the use of AP 720 as a relay device is transparent to a user of mobile device 702. That is, preferably the user of mobile device 702 continues to use the mobile device as if nothing has happened and is unaware that AP 720 is being used by mobile device 702 to transmit voice and/or data messages to, and receive voice and/or data messages from, wireless network 730. That is, in response to determining to utilize AP 720 as a relay device, mobile device 702 establishes (812) a short-range communication session, using a short-range wireless communication protocol, between the mobile device 702 and AP 720. For example, mobile device 702 may perform a handshake with AP 720 and exchange messages that pair the two devices based on the Bluetooth or Wi-Fi protocol. AP 720 then may allocate wireless resources to mobile device 702 and establish a short-range wireless link 724 with the mobile device utilizing the allocated resources in accordance with well-known short-range, such as Bluetooth or Wi-Fi, wireless communication protocols. Further, AP 720 may store, in association with the allocated resources, a mobile device identifier associated with mobile device 702, so that AP 720 can identify messages received from wireless network 730 and intended for mobile device 702 and can route such messages to the mobile device.

For example, AP 720 may be pre-configured to operate with network 730 and to wirelessly backhaul signaling to, and wirelessly receive downlink signaling from, network 730 via air interface 732. Subsequent to establishing short-range wireless link 724 with mobile device 702, AP 720 automatically backhauls, to wireless network 730 via air interface 732, messages received from mobile device 702 via wireless link 724. And in response to receiving downlink messages from wireless network 730 over air interface 732 and intended for mobile device 702, AP 720 automatically relays such messages to mobile device 702 over wireless link 724.

By way of another example, mobile device 702 may send, to AP 720 via a one or more control messages, access information associated with first network 730 and communication session and identification information associated with the mobile device, such as a mobile device identifier or a user identifier. This can include sending an associated Access Point Name (APN) to AP 720 via the one or more control messages. In response to receiving the access information and identification information, AP 720 may perform bearer attachment with first network 730 using the access information and identification information specified in the one or more control messages. For example, AP 720 can perform a new bearer attachment transaction with the first network using the APN specified by mobile device 702 and register with any network application being utilized by first mobile device 702 as part of the first communication session.

Mobile device 702 then may begin to use AP 720 as a relay device for the first communication session, that is, using AP 720 to relay (814) voice and/or data messages between wireless network 730 and the mobile device via air interface 732 and wireless link 724. Logic flow 800 then ends (816). By transferring, from mobile device 702 to AP 720, uplink and downlink WAN transmissions that are part of the first communication session, the mobile device is better able to assure that such uplink WAN transmissions as part of the first communication session will not interfere with downlink reception by the mobile device as part of the second communication session.

The embodiments of the present invention preferably are implemented within each of mobile devices 202, 212, and 702, and more particularly with or in software programs and instructions stored in the at least one memory devices 304 and executed by the processors 302 of the mobile devices. However, one of ordinary skill in the art realizes that the embodiments of the present invention alternatively may be implemented in hardware, for example, integrated circuits (ICs), application specific integrated circuits (ASICs), and the like, such as ASICs implemented in one or more of mobile devices 202, 212, and 702, and all references to 'means for' herein may refer to any such implementation of the present invention. Based on the present disclosure, one skilled in the art will be readily capable of producing and implementing such software and/or hardware without undo experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the expressions "air interface" and "wireless link" are intended to be used interchangeably herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for mitigating interference between communication sessions, the system comprising:
   a first mobile device and a second mobile device, wherein each of the first mobile device and the second mobile device comprises a first modem that operates according to a first wireless communication protocol and a second modem that operates according to a second wireless communication protocol;
   wherein the first mobile device is configured to establish a first communication session using the first modem of the first mobile device and the first wireless communication protocol; and
   wherein the second mobile device is configured to:
      establish a second communication session using the second modem of the second mobile device and the second wireless communication protocol;
      determine a geographical proximity of the first mobile device;
      based on the determined geographical proximity, determine that one of the first mobile device and the second mobile device is a potential interferer for the other mobile device of the first mobile device and the second mobile device;
      in response to determining that one of the first mobile device and the second mobile device is a potential interferer for the other mobile device, arrange for a transfer of the first communication session to the second mobile device; and
      in response to transferring the first communication session to the second mobile device, operate to mitigate interference at the second mobile device between the first communication session and the second communication session.

2. The system of claim 1, wherein the second mobile device is configured to determine the geographical proximity of the first mobile device by determining whether the second mobile device is able to establish a short-range wireless link with the first mobile device.

3. The system of claim 2, wherein the second mobile device is configured to determine that one of the first mobile device and the second mobile device is a potential interferer for the other mobile device by determining that the second mobile device is able to establish a short-range wireless link with the first mobile device.

4. The system of claim 2, wherein the short-range wireless link comprises one of a Bluetooth link and a Wi-Fi link.

5. The system of claim 1, wherein the second mobile device is configured to determine the geographical proximity of the first mobile device by:
receiving location information associated with the first mobile device; and
determining the geographical proximity of the first mobile device based on the received location information.

6. The system of claim 5, wherein the second mobile device is configured to determine that the first mobile device is a potential interferer for the second mobile device by:
comparing the determined geographical proximity of the first mobile device to a proximity threshold; and
when the determined geographical proximity is less than the proximity threshold, determining that one of the first mobile device and the second mobile device is a potential interferer for the other mobile device.

7. The system of claim 1, wherein the second mobile device is configured to operate to mitigate interference between the first communication session and the second communication session by gating uplink transmissions for one communication session of the first and second communication sessions when receiving on a downlink for the other communication session of the first and second communication sessions.

8. The system of claim 1, wherein the second mobile device is configured to operate to mitigate interference between the first communication session and the second communication session by roaming to a channel, for one communication session of the first and second communication sessions, that is more remote in frequency from a channel currently used for the other communication session of the first and second communication sessions.

9. A system for mitigating interference between communication sessions, the system comprising:
a first mobile device and a second mobile device, wherein each of the first mobile device and the second mobile device comprises a first modem that operates according to a first wireless communication protocol and a second modem that operates according to a second wireless communication protocol;
wherein the first mobile device is configured to:
establish a first communication session using the first modem of the first mobile device and the first wireless communication protocol;
establish a second communication session using the second modem of the first mobile device and the second wireless communication protocol;
determine a geographical proximity of the first mobile device to the second mobile device;
based on the determined geographical proximity, determine to transfer the second communication session to the second mobile device; and
in response to determining to transfer the second communication session, transfer the second communication session to the second mobile device.

10. The system of claim 9, wherein the first mobile device is configured to determine the geographical proximity of the second mobile device by determining whether the first mobile device is able to establish a short-range wireless link with the second mobile device.

11. The system of claim 10, wherein the first mobile device is configured to determine to transfer the second communication session to the second mobile device by determining that the first mobile device is unable to establish a short-range wireless link with the second mobile device.

12. The system of claim 10, wherein the short-range wireless link comprises one of a Bluetooth link and a Wi-Fi link.

13. The system of claim 9, wherein the first mobile device is configured to determine the geographical proximity of the second mobile device by:
receiving location information associated with the second mobile device; and
determining the geographical proximity of the second mobile device based on the received location information.

14. The system of claim 13, wherein the first mobile device is configured to determine to transfer the second communication session to the second mobile device by:
comparing the determined geographical proximity of the second mobile device to a proximity threshold; and
when the determined geographical proximity is greater than the proximity threshold, determining to transfer the second communication session to the second mobile device.

* * * * *